US011807980B2

(12) United States Patent
Hull (10) Patent No.: US 11,807,980 B2
(45) Date of Patent: *Nov. 7, 2023

(54) DUAL MOTOR DRYER DRIVE CONTAINED WITHIN A COMMON ASSEMBLY

(71) Applicant: WHIRLPOOL CORPORATION, Benton Harbor, MI (US)

(72) Inventor: James B. Hull, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/747,062

(22) Filed: May 18, 2022

(65) Prior Publication Data
US 2022/0275565 A1 Sep. 1, 2022

Related U.S. Application Data (63) Continuation of application No. 16/589,646, filed on Oct. 1, 2019, now Pat. No. 11,365,509.

(51) Int. Cl.
*D06F 58/08* (2006.01)
*H02P 5/50* (2016.01)

(52) U.S. Cl.
CPC .......... *D06F 58/08* (2013.01); *H02P 5/50* (2013.01)

(58) Field of Classification Search
CPC ................................. D06F 58/08; H02P 5/05
USPC .......................................................... 34/601
See application file for complete search history.

(56) References Cited

U.S. PATENT DOCUMENTS

| 4,553,075 | A | * | 11/1985 | Brown ................. F04D 25/066 310/68 R |
| 6,479,957 | B1 | | 11/2002 | Erdman et al. |
| 6,874,250 | B2 | | 4/2005 | Prajescu et al. |
| 7,525,262 | B2 | | 4/2009 | Carow |
| 8,704,467 | B2 | | 4/2014 | Hosoito et al. |
| 8,997,375 | B2 | | 4/2015 | Bae et al. |
| 9,303,347 | B2 | | 4/2016 | Hull |
| 9,570,961 | B2 | | 2/2017 | Skinner |
| 9,667,126 | B2 | | 5/2017 | Shen et al. |
| 10,566,856 | B2 | * | 2/2020 | Zhang ................... H02K 17/12 |
| 10,704,189 | B2 | | 7/2020 | Christensen et al. |

(Continued)

FOREIGN PATENT DOCUMENTS

DE 202005010219 U1 12/2005
DE 102011078917 A1 1/2013
(Continued)

*Primary Examiner* — Stephen M Gravini
(74) *Attorney, Agent, or Firm* — Price Heneveld LLP (57) ABSTRACT

According to one aspect of the present disclosure, an electric motor for a laundry appliance includes a first stator having a central axis. A first rotor is in electromagnetic communication with the first stator and is rotationally operable about the central axis. A second stator is aligned with the central axis. A second rotor is in electromagnetic communication with the second stator and is rotationally operable about the central axis. The first and second stators are positioned within a common motor cavity of an outer housing. A controller regulates a first electrical current to the first stator and a second electrical current to the second stator. The controller includes a torque discrimination module for monitoring an output torque of at least the first rotor.

20 Claims, 6 Drawing Sheets

(56) References Cited

U.S. PATENT DOCUMENTS

| | | | |
|---|---|---|---|
| 10,724,169 B2 | 7/2020 | Vian et al. | |
| 10,907,291 B2 * | 2/2021 | Chai | D06F 35/007 |
| 11,165,321 B2 | 11/2021 | Marioni | |
| 11,365,509 B2 * | 6/2022 | Hull | D06F 58/08 |
| 2012/0167636 A1 | 7/2012 | Nakamoto et al. | |
| 2013/0326825 A1 | 12/2013 | Lilie | |
| 2016/0160429 A1 * | 6/2016 | Vian | D06F 58/38 34/443 |
| 2018/0327954 A1 * | 11/2018 | Nakanishi | D06F 37/20 |
| 2020/0347538 A1 | 11/2020 | Bhargava et al. | |
| 2021/0091608 A1 | 3/2021 | Hull | |
| 2021/0095415 A1 | 4/2021 | Hull | |
| 2021/0246595 A1 * | 8/2021 | Papsdorf | D06F 37/22 |
| 2021/0388552 A1 * | 12/2021 | Adachi | D06F 34/04 |
| 2022/0275565 A1 * | 9/2022 | Hull | H02K 16/00 |

FOREIGN PATENT DOCUMENTS

| | | | | |
|---|---|---|---|---|
| DE | 202015009553 U1 | 3/2018 | | |
| EP | 1688532 A2 | 8/2006 | | |
| EP | 1860229 A1 | 11/2007 | | |
| EP | 2281935 A1 | 2/2011 | | |
| EP | 2391544 A2 | 12/2011 | | |
| EP | 3474429 A1 | 4/2019 | | |
| EP | 3800769 A1 * | 4/2021 | | D06F 58/08 |
| EP | 3800769 A1 | 4/2021 | | |
| WO | 2015082018 A1 | 6/2015 | | |

\* cited by examiner

DUAL MOTOR DRYER DRIVE CONTAINED WITHIN A COMMON ASSEMBLY

CROSS-REFERENCE TO RELATED APPLICATION

The present application is a continuation of U.S. patent application Ser. No. 16/589,646 filed Oct. 1, 2019, now U.S. Pat. No. 11,365,509, entitled DUAL MOTOR DRYER DRIVE CONTAINED WITHIN A COMMON ASSEMBLY, the entire disclosure of which is hereby incorporated herein by reference.

FIELD OF THE DEVICE

The device is in the field of laundry appliances, and more specifically, a motor for a laundry appliance that includes a dual rotor configuration that is contained within a single assembly.

SUMMARY OF THE DEVICE

According to one aspect of the present disclosure, an electric motor for a laundry appliance includes a first stator having a central axis. A first rotor is in electromagnetic communication with the first stator and is rotationally operable about the central axis. A second stator is aligned with the central axis. A second rotor is in electromagnetic communication with the second stator and is rotationally operable about the central axis. The first and second stators are positioned within a common motor cavity of an outer housing. A controller regulates a first electrical current to the first stator and a second electrical current to the second stator. The controller includes a torque discrimination module for monitoring an output torque of at least the first rotor.

According to another aspect of the present disclosure, a laundry appliance includes a blower that delivers process air through an airflow path. A rotating drum processes articles to be dehumidified. The airflow path includes the rotating drum and first and second stators. A first rotor is in electromagnetic communication with the first stator and operates to rotate the rotating drum. A second rotor is in electromagnetic communication with the second stator and operates to rotate the blower. A torque discrimination module is in communication with the first stator and the first rotor. The torque discrimination module monitors a first electrical current that is delivered to the first stator. A controller is in communication with the first and second stators and the torque discrimination module. The controller delivers the first electrical current to the first stator at least partially in response to a reading of the torque discrimination module.

According to yet another aspect of the present disclosure, a laundry appliance includes a blower that delivers process air through an airflow path. A rotating drum separates condensate from articles to be processed. The airflow path includes the rotating drum. A fluid pump delivers the condensate through a fluid path. First and second stators are contained within a housing. A first rotor is in electromagnetic communication with the first stator and that operates to rotate the rotating drum. A second rotor is in electromagnetic communication with the second stator and operates to rotate the blower and the fluid pump. A torque discrimination module is in communication with the first stator and the first rotor. The torque discrimination module monitors a first electrical current that is delivered to the first stator.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to a dual-drive motor for a laundry appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
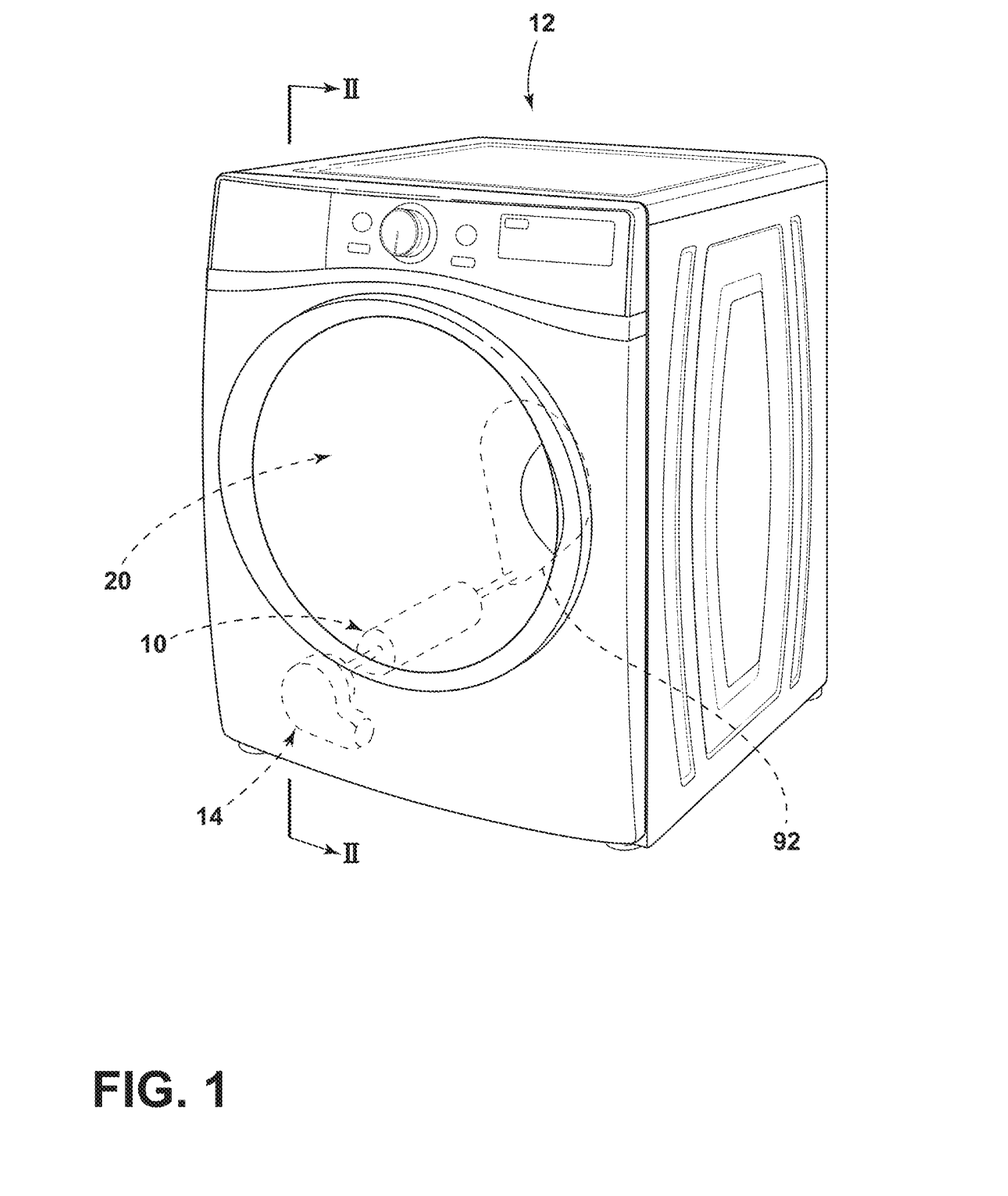
FIG. 1 is a front perspective view of a laundry appliance that incorporates an aspect of the dual-drive motor.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
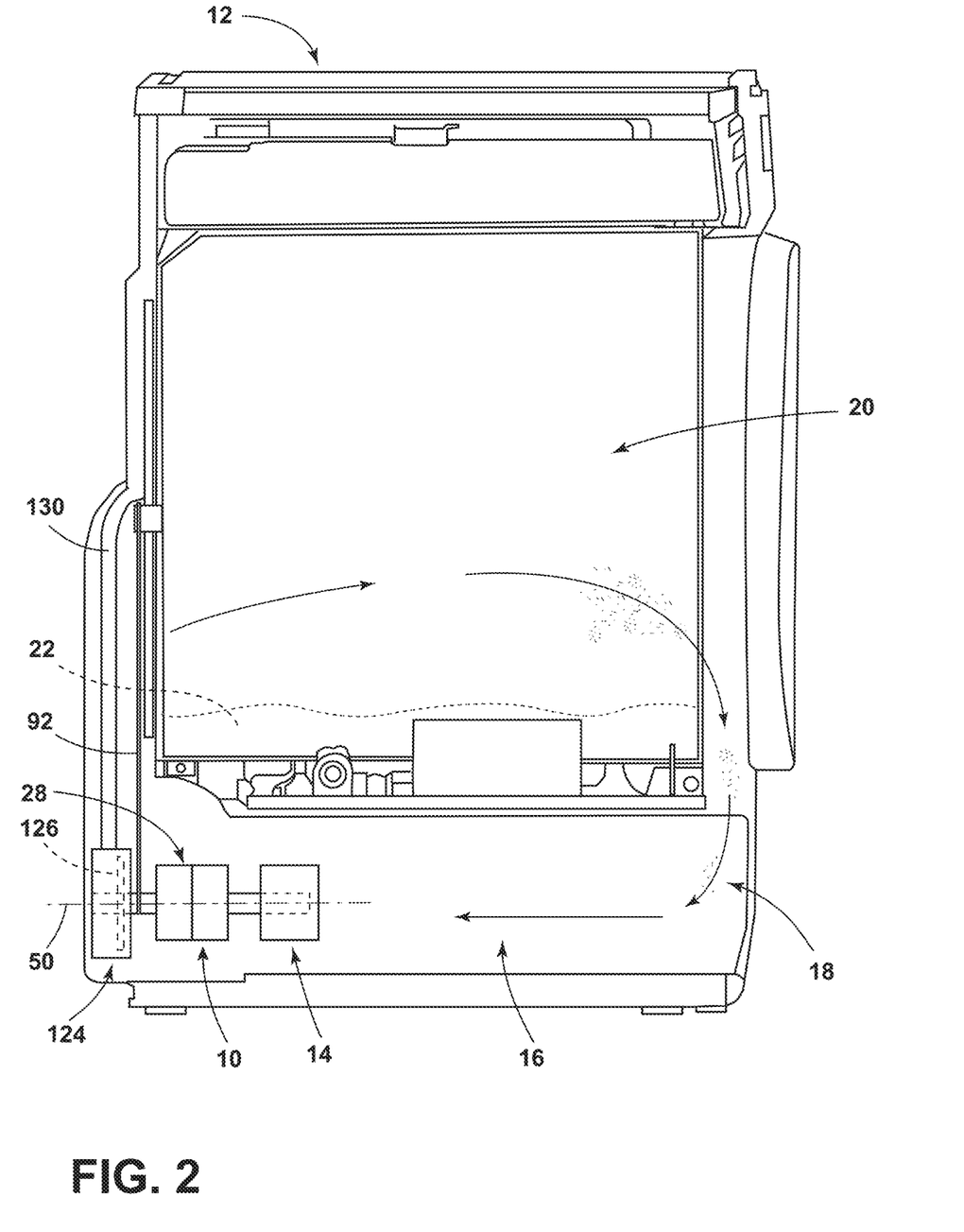
FIG. 2 is a cross-sectional view of the laundry appliance of FIG. 1 taken along line II-II.
Figure 3:
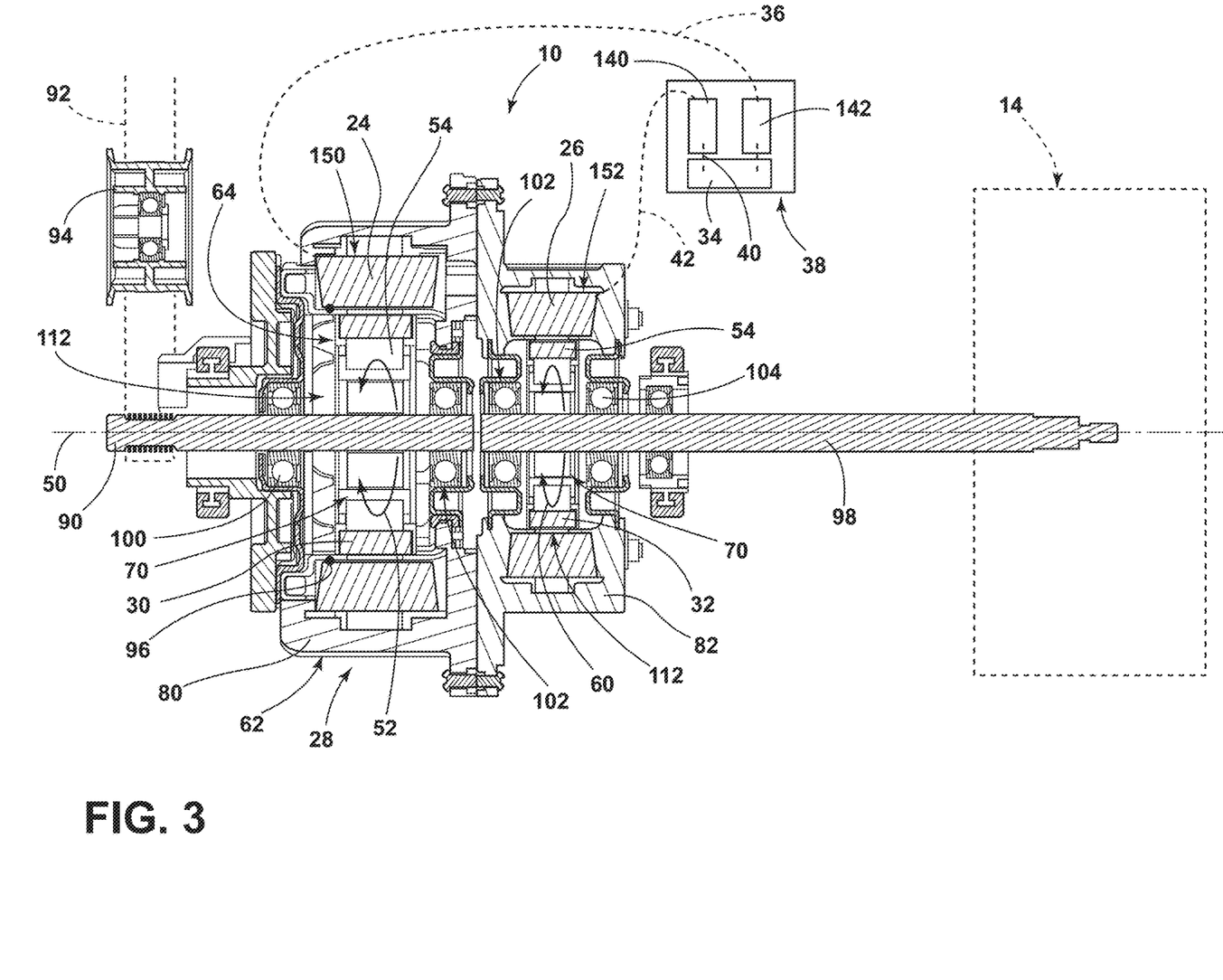
FIG. 3 is a cross-sectional view of an aspect of the dual-drive motor having two inner-type rotors.

With respect to FIGS. 1-3, reference numeral 10 generally refers to an electric motor, having a dual-drive system for operating multiple components within a laundry appliance 12. According to various aspects of the device, the laundry appliance 12 includes a blower 14 that delivers process air 16 through an airflow path 18. A rotating drum 20 is included for processing articles 22 to be dehumidified. The airflow path 18 includes the rotating drum 20, where the blower 14 delivers process air 16 through the rotating drum 20 for processing the articles 22. First and second stators 24, 26 are included within the dual-drive motor 28. A first rotor 30 is in electromagnetic communication with the first stator 24. The first rotor 30 operates to rotationally operate the rotating drum 20. A second rotor 32 is in electromagnetic communication with the second stator 26. The second rotor 32 operates to rotate the blower 14 for moving the process air 16 through the airflow path 18, including the rotating drum 20. A torque discrimination module 34 is in communication with at least the first stator 24 and the first rotor 30. The torque discrimination module 34 monitors a first electrical current 36 that is delivered to the first stator 24. A controller 38 is in communication with the first and second stators 24, 26 and the torque discrimination module 34. The controller 38 delivers the first electrical current 36 to the first stator 24 at least partially in response to a voltage reading or other similar reading 40 of the torque discrimination module 34. The controller 38 also delivers a second electrical current 42 to the second stator 26. It is contemplated that the first and second electrical currents 36, 42 are separately delivered to the first and second stators 24, 26, respectively, via dedicated drivers. Accordingly, modifications to the first and second electrical currents 36, 42 are independent of one another such that the first and second rotors 30, 32 can operate at different rotational speeds relative to the corresponding first and second stators 24, 26. According to various aspects of the device, the torque discrimination module 34 can be incorporated within the controller 38 where voltage or current sensors of the torque discrimination module 34 are incorporated into the controller 38.

Figure 4:
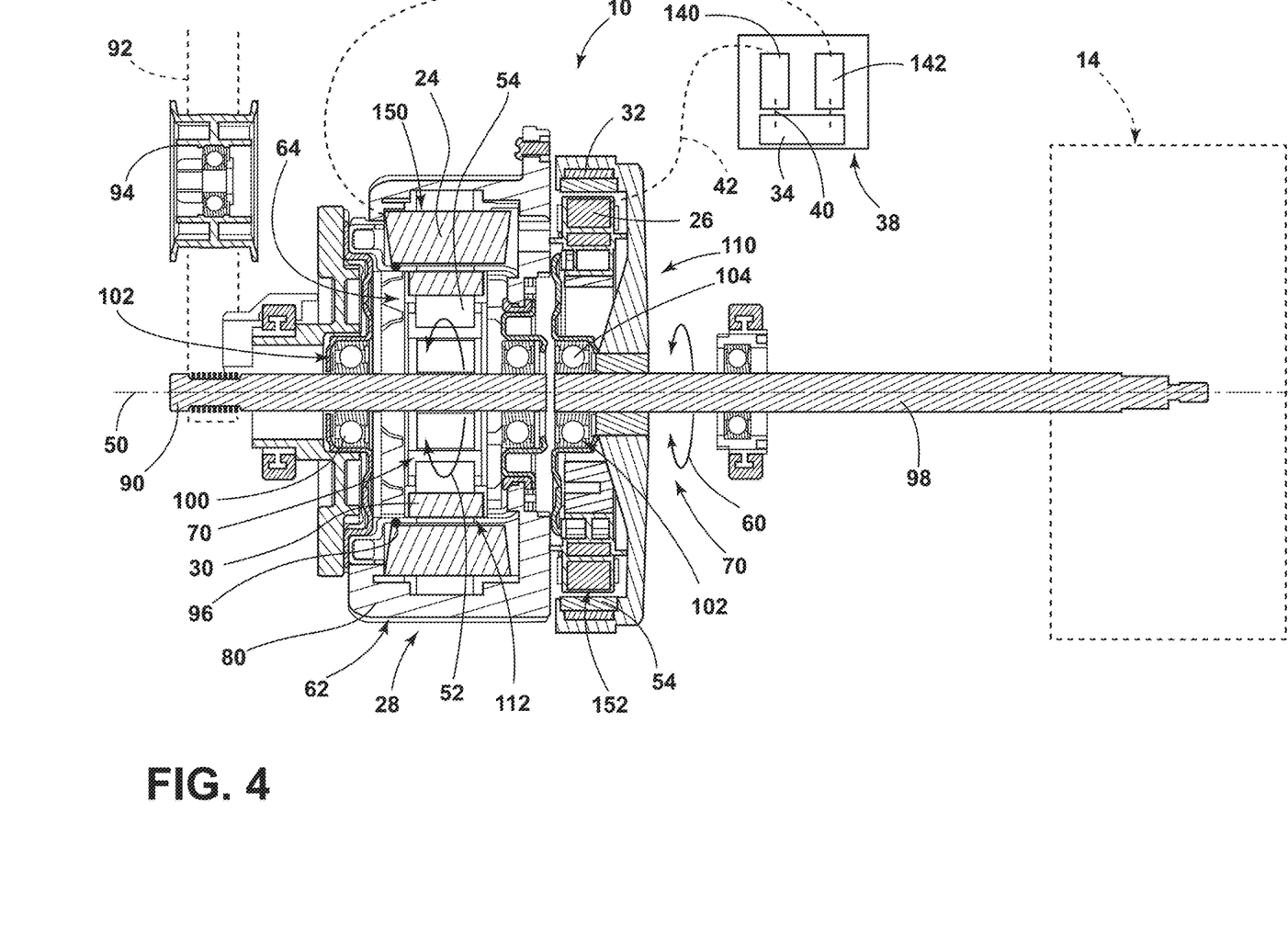
FIG. 4 is a cross-sectional view of an aspect of the dual-drive motor having an inner-type rotor and an outer-type rotor.
Figure 5:
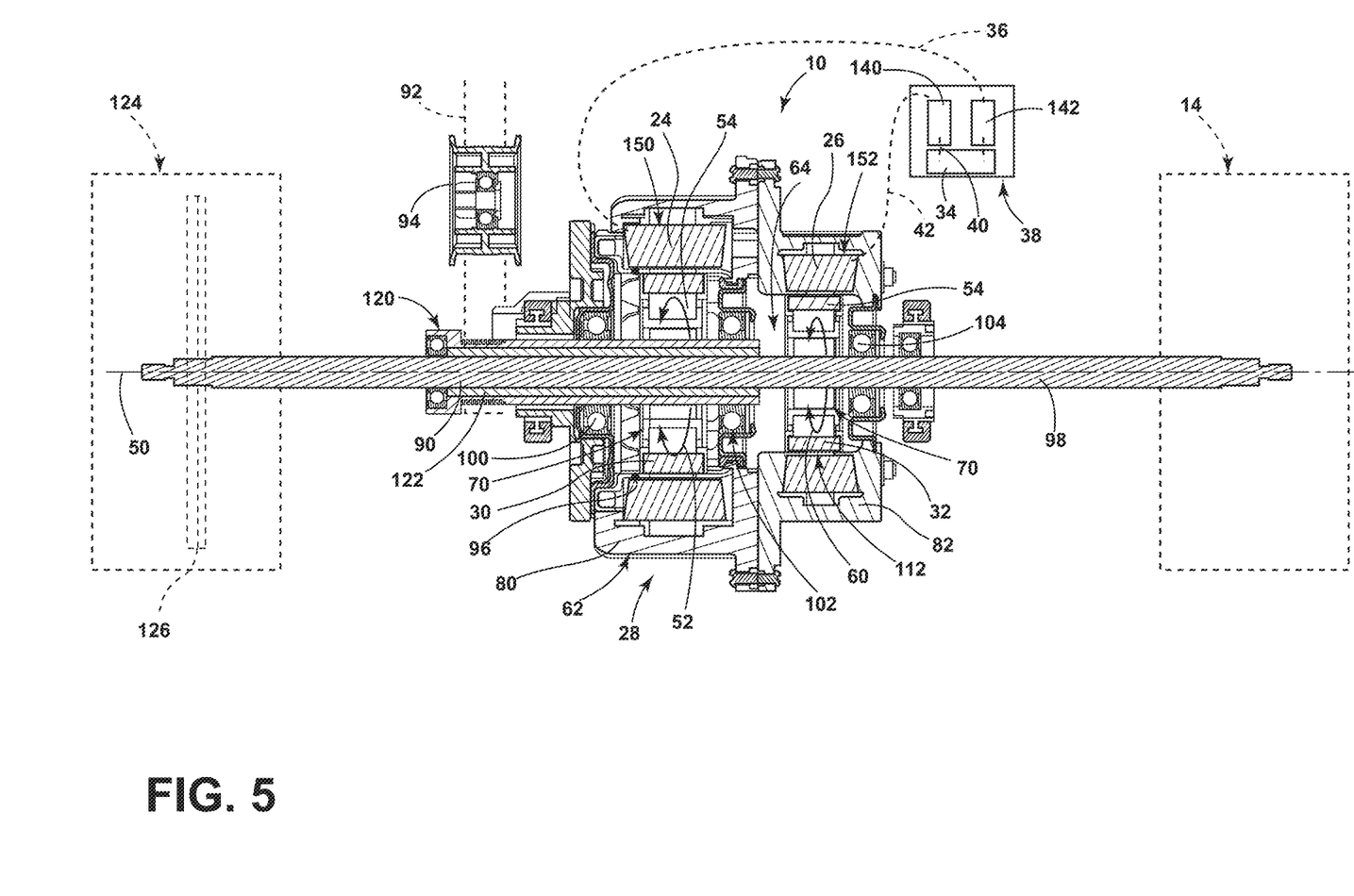
FIG. 5 is a cross-sectional view of a dual-drive motor that includes inner and outer drive shafts for operating a rotating drum, a blower, and a fluid pump.
Figure 6:
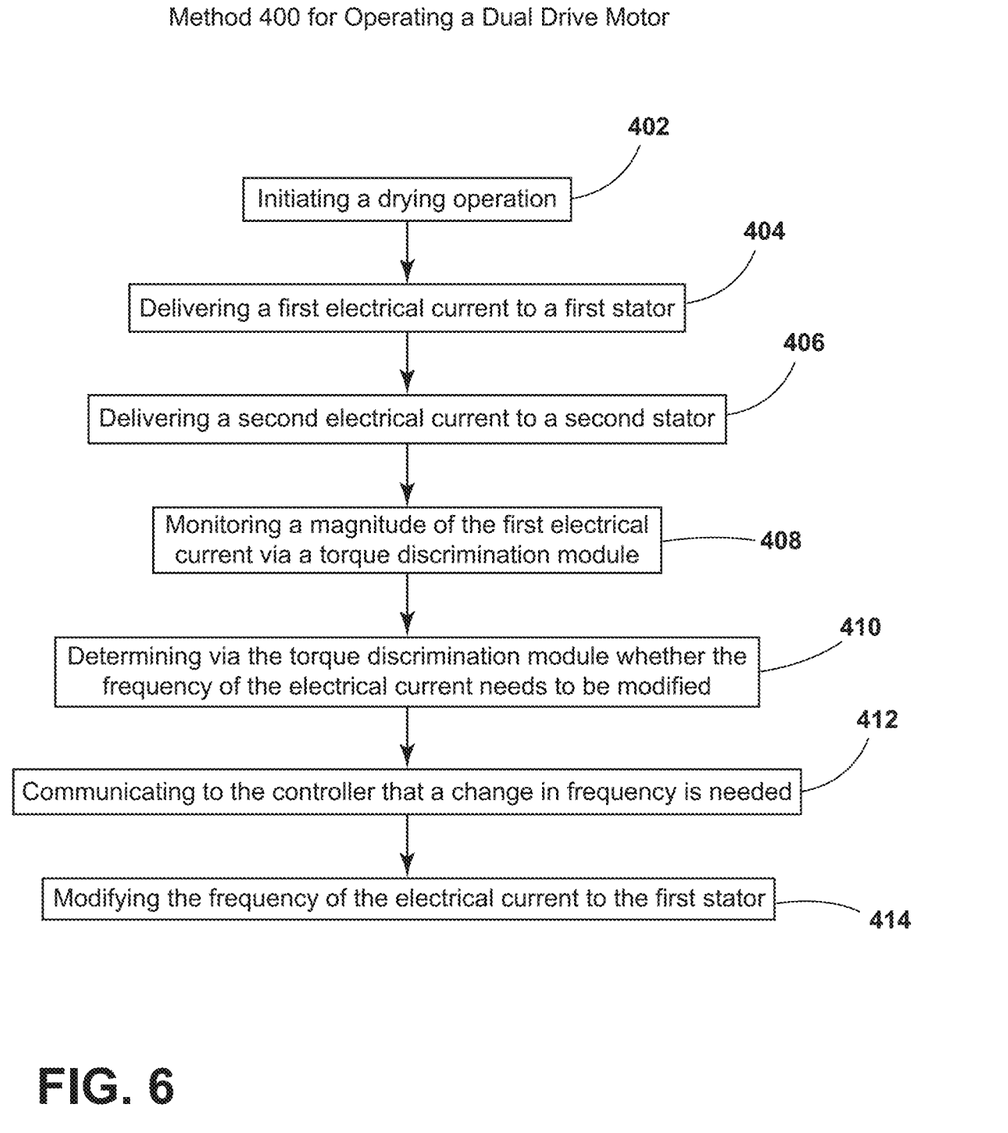
FIG. 6 is a schematic flow diagram illustrating a method for operating a dual-drive motor fora laundry appliance.

Referring now to FIGS. 3-5, being non-limiting examples of the device, the electric motor 10, as discussed herein, is a dual-drive motor 28 where the first stator 24 is positioned along a central axis 50. The first rotor 30 is in electromagnetic communication with the first stator 24 and is rotationally operable about the central axis 50. When the first electrical current 36 is delivered to the first stator 24, the first stator 24 generates an electromagnetic field that interacts with magnets 54 of the first rotor 30. This interaction generates a first electromotive force 52 that operates the first rotor 30 relative to the first stator 24 and about the central axis 50. The second stator 26 is also aligned with the central axis 50 and is typically positioned axially adjacent to the first stator 24. Through this configuration, the first and second rotors 30, 32 are also positioned axially adjacent relative to one another. This configuration can serve to minimize the interaction or interference from the electromagnetic fields generated by the first and second stators 24, 26.

Referring again to FIG. 3, the second rotor 32 is in electromagnetic communication with the second stator 26 and is rotationally operable about the central axis 50. When the second electrical current 42 is delivered to the second stator 26, the electromagnetic field interacts with the magnets 54 of the second rotor 32 to generate the second electromotive force 60 that operates the second rotor 32 about the second stator 26 and the central axis 50. An outer housing 62 defines a common motor cavity 64, where the first and second stators 24, 26 are positioned within this common motor cavity 64 of the outer housing 62. Accordingly, the dual-drive motor 28 can be a singular unit that is installed within the laundry appliance 12.

It is contemplated that this dual-drive motor 28 can be a retrofit component that can be installed within after-market laundry appliances 12. The dual-drive motor 28 can also be installed within new laundry appliances 12 during manufacture.

As exemplified in FIGS. 3-5, the controller 38 regulates the first electrical current 36 to the first stator 24 and the second electrical current 42 to the second stator 26. The controller 38 includes the torque discrimination module 34 for monitoring at least the output torque 70, which can be in the form of the first electromotive force 52, of at least the first rotor 30. It should be understood that the torque discrimination module 34 can also include a component for monitoring the output torque 70 of the second rotor 32 as well as the second electrical current 42 that is delivered to the second stator 26.

As exemplified in FIGS. 3 and 5, the outer housing 62 extends around each of the first and second stators 24, 26 of the dual-drive motor 28. Accordingly, the outer housing 62 can include a first housing 80 that surrounds the first stator 24 and a second housing 82 that surrounds the second stator 26. In such an embodiment, the first and second housings 80, 82 are then attached together to define the common motor cavity 64. Through this configuration, the components of the first stator 24 and the first rotor 30 can be manufactured within the first housing 80 and the components of the second stator 26 and the second rotor 32 can be manufactured within the second housing 82. This first and second housings 80, 82 can then be attached to one another to form the common motor cavity 64 and the unitary dual-drive motor 28 that can be installed within a laundry appliance 12.

In various aspects of the device, it is contemplated that the outer housing 62 can be made of a single overmold that surrounds the first and second stators 24, 26. In such a configuration, it is typical that the first and second rotors 30, 32 are outer-type rotors 110 that rotate about the first and second stators 24, 26, respectively. It is also contemplated that one of the first and second housings 80, 82 can include a single overmold that surrounds the respective first and second stator 24, 26, as shown in FIG. 4.

As discussed herein, and as exemplified in FIGS. 1-3, the first rotor 30 is rotationally coupled to the rotating drum 20. Accordingly, the first electromotive force 52 that is generated between the first stator 24 and the first rotor 30 operates a first drive shaft 90. This first drive shaft 90 is coupled with the rotating drum 20 via a linkage 92, typically a drive belt, that extends between the first drive shaft 90 and the rotating drum 20. Various intermediary pulleys 94 can be included to guide operation of the linkage 92 between the first drive shaft 90 and the rotating drum 20. The first stator 24 and the first rotor 30 can also include one or more positioning sensors 96 that are included to monitor a position of the first rotor 30 with respect to the first stator 24, as well as a rotational speed of the first rotor 30 with respect to the first stator 24. These positioning sensors 96 can be used to determine whether the first rotor 30 is rotating at the appropriate rotational speed for accomplishing various laundry-related functions of the laundry appliance 12. It is contemplated that the same positioning system incorporating the positioning sensors 96 can be used between the second rotor 32 and the second stator 26. It is also contemplated that the positioning system can be a sensorless system where no positioning sensors 96 are included.

Referring again to FIGS. 1-3, using the torque discrimination module 34, the first electrical current 36 delivered to the first stator 24 is monitored to determine whether the first rotor 30 and, in turn, the rotating drum 20 are operating at appropriate rotational speed. The torque discrimination module 34 is also used to determine the torque output 70 of the first rotor 30 with respect to the rotating drum 20. In certain conditions, the speed of the rotating drum 20 may be altered for processing a larger load or heavier load of articles 22 that may include a high moisture content. During operation of the rotating drum 20, the initial stages of the drying function may require a higher output torque 70 from the first rotor 30 for operating the rotating drum 20 that contains the moisture-laden articles 22. The position positioning sensors 96 monitor the position and speed of the first rotor 30. Where the first rotor 30 is operating at a rotational speed that is below a desired rotational speed, or below a desired output torque 70, the torque discrimination module 34 communicates with the controller 38 to increase the voltage of the first electrical current 36 that is delivered to the first stator 24 to provide additional output torque 70 from the first rotor 30, via an increased first electromotive force 52, for operating the rotating drum 20 at an appropriate rotational speed. The torque discrimination module 34 communicates with the controller 38 to provide the appropriate magnitude of the first electrical current 36 to the first stator 24 for achieving the desired output torque 70 and, in turn, rotational speed of the rotating drum 20. Stated another way, where the first rotor 30 is operating at a rotational speed that is not a desired rotational speed based on the output torque 70, the torque discrimination module 34 communicates with the controller 38 to increase or decrease the frequency of the first electrical current 36 that is delivered to the first stator 24 to alter the speed of the first rotor 30 to provide an appropriate rotational speed of the rotating drum 20.

The torque discrimination module 34 can also be used to sense the conditions present within the rotating drum 20. Where the articles 22 contain a large amount of moisture, the rotating drum 20 requires a higher output torque 70 from the first rotor 30 to maintain the desired rotational speed. The torque discrimination module 34 detects this output torque by measuring the first electrical current 36. Over the course of the drying cycle, moisture is removed from the articles 22 and, as a consequence, less output torque 70 is needed to operate the rotating drum 20 and, in turn, the first electrical current 36 can be diminished. Again, the torque discrimination module 34 measures this change in the first electrical current 36. This change in the first electrical current 36 is indicative of the change in the amount of moisture within the articles 22 within the rotating drum 20. Based upon this measured change in the moisture content of the articles 22, the speed of the blower, the heat of the process air 16, the rotational speed of the drum 20 or any combination of these functions can be modified to provide an appropriate environment within the rotating drum 20 to continue the drying cycle. Using the torque discrimination module 34, the first electrical current 36 is monitored to assess what changes can be made to the second electrical current 42 for modifying the process air 16 or what changes can be made to the first electrical current 36 for modifying the operation of the rotating drum 20.

According to various aspects of the device, over the course of the drying operation, moisture is removed from the moisture-laden articles 22 and the load becomes lighter in weight. As a consequence, a lower output torque 70 may be required from the first rotor 30 for operating the rotating drum 20. Over the course of the drying operation, the amount of output torque 70 required for operating the rotating drum 20 decreases. In turn, the amount of voltage required to be delivered to the first stator 24 via the first electrical current 36 also diminishes. Using the torque discrimination module 34, an appropriate frequency of the first electrical current 36 can be delivered to the first stator 24 for achieving the desired rotational speed of the rotating drum 20. By manipulating the frequency of the first and second electrical currents 36, 42 that are delivered to the first stator 24 and the second stator 26, respectively, the cycle for the laundry appliance 12 over the course of the laundry cycle can be optimized for time, energy, gentleness or other factors related to the laundry cycle.

During operation of the appliance 12, the torque discrimination module 34 can be used to adjust the conditions within the rotating drum 20. By independently operating the rotational speed of the rotating drum 20, as well as the operational speed of the blower 14, the speed of the process air 16, the temperature of the process air 16 and the rate at which the articles 22 are agitated within the rotating drum 20 can be adjusted over the course of the drying cycle. With respect to the temperature of the process air 16, a thermal exchange device, such as a heater, heat pump, condenser or other similar device, is coupled with the airflow path 18. This heater heats the process air 16 during operation of the drying cycle. If the blower 14 operates at a faster operational speed, the process air 16 moves across the heater more quickly and the process air 16 may only be minimally heated due to the short period of time that the process air 16 is in contact with the heater. Where the blower 14 operates at a slower operational speed, the process air 16 engages the heater for a longer period of time and the temperature is elevated to a higher air temperature. Using the blower 14, variations in the temperature of the process air 16 that is moved into the rotating drum 20 can be adjusted based on conditions present within the rotating drum 20 or to proactively modify the conditions within the rotating drum 20.

As discussed previously, the torque discrimination module 34 provides feedback concerning the amount of moisture contained within the rotating drum 20. Accordingly, as moisture is present within the rotating drum 20, the air temperature of the process air 16 may be changed to optimize the electrical usage for the appliance 12 during operation of the laundry cycle. As discussed above, the operational speed of the blower 14 may be adjusted, to vary the heat level, the airflow speed of the process air 16, or both, where the second stator 26 and the second rotor 32 define a variable speed motor. Where the second stator 26 and the second rotor 32 define a single speed motor, an electrical current delivered to the heater may be adjusted. In such an aspect of the device, the torque discrimination module 34 can provide information concerning the amount of heat required to complete a drying cycle such that the frequency or the duty cycle of the electrical current delivered to the heater can be increased or decreased to provide differing amounts of heat to the process air 16 for serving the rotating drum 20. As discussed previously, because the first and second rotors 30, 32 can be operated at different rotational speeds, the torque discrimination module 34 can be utilized to optimize the rotational speeds of the first and second rotors 30, 32. The first and second electrical currents 36, 42, as well as an electrical current delivered to the heater for the appliance 12 can also be optimized through operation of the torque discrimination module 34.

The second rotor 32 is typically coupled with the blower 14 for the laundry appliance 12. This blower 14 is used to move process air 16 through the airflow path 18. This movement of process air 16 typically requires a consistent amount of output torque 70 from the second rotor 32 for operating the blower 14. Because the first and second electrical currents 36, 42 are separately provided to the first and second stators 24, 26, changes in the output torque 70 of the first rotor 30 through manipulation of the first electrical current 36 do not affect the output torque 70 of the second rotor 32 for operating the blower 14. Accordingly, the dual-drive motor 28 utilizes and efficiently delivers an appropriate amount of the first and second electrical currents 36, 42 to the first and second stators 24, 26, respectively, for achieving the desired output torque 70 of the first and second rotors 30, 32.

According to various aspects of the device, the torque discrimination module 34 can be in the form of a voltage sensor that monitors the first electrical current 36 and the amount of voltage that is delivered to the first stator 24. Other sensors may be utilized for monitoring the output torque 70 of the first rotor 30 and the voltage delivered to the first stator 24 via the first electrical current 36.

Referring again to FIGS. 1-5, the use of the dual-drive motor 28 can provide for independent operation of the first and second rotors 30, 32. Using the dual-drive motor 28, the blower 14 can be operated independent of the rotating drum 20 so that process air 16 can be moved through the rotating drum 20 without agitating the clothing by operating the rotating drum 20. Additionally, the rotating drum 20 can be operated independent of the blower 14 to agitate or reposition the clothing within the rotating drum 20, without providing process air 16 that might provide an unwanted amount of drying or moisture removal from the articles 22 within the rotating drum 20. Typically, the dual-drive motor 28 is provided for generating varying amounts of output torque 70 via the first rotor 30 for operating the rotating drum 20. At the same time, the second rotor 32 can provide a generally consistent amount of output torque 70 for operating the blower 14 for moving process air 16 through the airflow path 18 and the rotating drum 20. It is contemplated that the controller 38 can modify the second electrical current 42 that is delivered to the second stator 26 for modifying the speed of the blower 14 for providing additional or decreased amounts of processed air to be moved through the rotating drum 20. Again, these variations in the first and second electrical currents 36, 42 are independent of one another such that operation of the rotating drum 20 and operation of the blower 14 are independently performed by the controller 38.

As exemplified in FIG. 3, the first and second rotors 30, 32 are typically inner-type rotors 112 that are configured to rotationally operate within the first and second stators 24, 26, respectively. In such a configuration, a first drive shaft 90 can be supported by a first set 100 of bearings 102 and extend along the central axis 50. A second drive shaft 98 extends along the central axis 50 and is supported by a second set 104 of bearings 102. In this configuration, the first rotor 30 rotationally operates the first drive shaft 90 and the second rotor 32 rotationally operates the second drive shaft 98. Again, each of the first and second rotors 30, 32 and the first and second drive shafts 90, 98 operate along the rotational central axis 50 of the dual-drive motor 28.

As exemplified in FIG. 4, the dual-drive motor 28 can include a configuration where the second rotor 32 is an outer-type rotor 110 that is configured to operate the blower 14. The first rotor 30 can be an inner-type rotor 112 for operating the rotating drum 20 via the first drive shaft 90. According to various aspects of the device, it is contemplated that the first and second rotors 30, 32 can be varying combinations of inner and outer-type rotors 112, 110. Typically, each of the first and second rotors 30, 32 are inner-type rotors 112 that are coupled with the first and second drive shafts 90, 98, respectively.

As exemplified in FIG. 5, the first drive shaft 90 can extend through the entire dual-drive motor 28. In such a configuration, the second drive shaft 98 is operated only by the second rotor 32. The first drive shaft 90 can be in the form of a drive tube 120 where the second drive shaft 98 extends through a bearing interface 122 defined within the drive tube 120 of the first drive shaft 90. In this configuration, the first rotor 30 rotates with the drive tube 120 of the first drive shaft 90 to operate the linkage 92 for rotating the rotating drum 20. In this configuration, the second drive shaft 98 can extend through the drive tube 120 to operate multiple components. These multiple components are typically in the form of the blower 14 and a secondary rotational mechanism 124 such as a fluid pump, a condenser fan or other secondary fan. Accordingly, operation of the second rotor 32 rotationally operates the second drive shaft 98 about the central axis 50. This second drive shaft 98 is used to operate the blower 14 and an impeller 126 of the secondary rotational mechanism 124 or the blade of a condenser fan, or other device that may be operated by the second drive shaft 98.

Typically, the blower 14 and the secondary rotational mechanism 124 are operated contemporaneously with one another. As process air 16 is moved, via operation of the blower 14, through the airflow path 18 and the rotating drum 20, moisture that is extracted by the process air 16 can be moved to a fluid channel and removed by the secondary rotational mechanism 124 that may be in the form of a fluid pump. As discussed above, operation of the first rotor 30 and the first drive shaft 90 is independent of the second rotor 32 and the second drive shaft 98. Accordingly, as the second drive shaft 98 operates, the first drive shaft 90, in the form of a drive tube 120, can independently operate about the second drive shaft 98 or, remain stationary relative to the second drive shaft 98 or vice versa.

Referring again to FIGS. 1-5, the laundry appliance 12 includes a blower 14 that delivers the process air 16 through the airflow path 18. The rotating drum 20 separates condensate from moisture-laden articles 22 to be processed within the rotating drum 20. The airflow path 18 includes a rotating drum 20. A fluid pump delivers the condensate through a fluid path 130. First and second stators 24, 26 are contained within a housing that includes a common motor cavity 64. The first rotor 30 is in electromagnetic communication with the first stator 24, where the first rotor 30 operates to rotate the rotating drum 20. The second rotor 32 is in electromagnetic communication with the second stator 26, where the second rotor 32 operates to rotate the blower 14 and the fluid pump. The torque discrimination module 34 is in communication with at least the first stator 24 and the first rotor 30. The torque discrimination module 34 monitors a first electrical current 36 that is delivered to the first stator 24. Accordingly, the controller 38 is in communication with the first and second stators 24, 26 and the torque discrimination module 34. This electromagnetic communication can also be described as an electromagnetic linkage between the first and second stators 24, 26 and the first and second rotors 30, 32, respectively.

Referring again to FIGS. 3-5, the controller 38 delivers the first electrical current 36 to the first stator 24 at least partially in response to a voltage reading or other similar reading 40 from the torque discrimination module 34. The controller 38 also delivers the second electrical current 42 to the second stator 26. Again, the first and second electrical currents 36, 42 are delivered separate and independent from one another. The separate and independent delivery of the first and second electrical currents 36, 42 can be accomplished through separate and dedicated drivers, where a first driver 140 is in communication with the first stator 24 and a second driver 142 is in communication with the second stator 26. These first and second drivers 140, 142 operate to provide an independent and dedicated magnitude of the first and second electrical currents 36, 42, respectively, to operate the first and second rotors 30, 32. Accordingly, each of the first and second rotors 30, 32 can provide an appropriate and dedicated output torque 70 for accomplishing various tasks during the drying cycle.

Referring now to FIGS. 1-6, having described various aspects of the device, a method 400 is disclosed for operating a dual-drive motor 28 for a laundry appliance 12. According to the method 400, a drying operation is initiated (step 402). The first electrical current 36 is delivered to the first stator 24 (step 404) and the second electrical current 42 is delivered to the second stator 26 (step 406). As discussed above, the first electrical current 36 is delivered to the first stator 24 for rotationally operating the first rotor 30 to operate the rotating drum 20. The second electrical current 42 is delivered to the second stator 26 for rotationally operating the second rotor 32 for operating at least the blower 14. In certain configurations of the device, the second rotor 32 can operate the blower 14 and components of a secondary rotational mechanism 124. According to the method 400, the torque discrimination module 34 monitors a magnitude of voltage that is delivered to the first stator 24 via the first electrical current 36 (step 408). Positioning sensors 96 positioned relative to the first rotor 30 also monitor a position and speed of the first rotor 30 with respect to the first stator 24. These components communicate with the controller 38 so that the controller 38, typically in combination with the torque discrimination module 34, can determine whether the amount of voltage delivered to the first stator 24 via the first electrical current 36 needs to be increased or decreased (step 410). Where the output torque 70 of the first rotor 30 is insufficient or excessive, the torque discrimination module 34 communicates with the controller 38 that the amount of voltage is inappropriate for providing the proper output torque 70 by the first rotor 30 for operating the rotating drum 20 (step 412). The controller 38, in response to the communication from the torque discrimination module 34, increases or decreases the voltage provided by the first electrical current 36 to the first stator 24 (step 414). The increase in voltage of the first electrical current 36 provides a greater output torque 70 of the first rotor 30 for operating the rotating drum 20. As discussed above, an increased output torque 70 of the first rotor 30 may be necessary where the moisture-laden articles 22 within the rotating drum 20 contain a high degree of moisture, such that the articles 22 have a significant weight. This significant weight can require a need for a greater output torque 70 by the first rotor 30 for operating a rotating drum 20. Conversely, where a particularly small load of articles 22 are being processed, the torque discrimination module 34 and the controller 38 can determine that the magnitude of the first electrical current 36 is excessive. These components can then cooperate to diminish the frequency of the first electrical current 36 that is delivered to the first stator 24.

Using the torque discrimination module 34, variations in the first electrical current 36 can be conducted without affecting the relatively consistent operation of the second rotor 32 for operating the blower 14 and a secondary rotational mechanism 124 such as a condenser fan or a fluid pump. This configuration can operate to increase the efficiency of the laundry appliance 12 and decrease the amount of electrical current necessary for operating the rotating drum 20, the blower 14 and the secondary rotational mechanism 124.

In conventional laundry appliances, increases and decreases in the amount of electrical provided to a motor can result in variations and operation of the rotating drum as well as the blower and a fluid pump. The speed of the blower and the speed of the pulley operating the drum are confined to the same speed; torque and speed variation are not possible. Accordingly, electrical current is provided for unnecessarily providing various components in a greater or lesser capacity than necessary.

As discussed above, the dual-drive motor 28 that is discussed herein can be incorporated within after-market laundry appliances 12. By installing the dual-drive motor 28 within an after-market appliance 12, the dual-drive motor 28, the torque discrimination module 34 and the various portions of a controller 38 are installed within the laundry appliance 12 for operating the dual-drive motor 28 disclosed herein.

It is contemplated that the dual-drive motor 28 disclosed herein can be used within various types of laundry appliances 12. These laundry appliances 12 can include, but are not limited to, washers, dryers, combination washers and dryers, heat pump dryers, condensing dryers, vented dryers, dishwashers, and other similar appliances 12 that have multiple rotationally operable components contained therein.

In various aspects of the device, the first and second stators 24, 26 of the dual-drive motor 28 can be incorporated within a single structural stator. In such an embodiment, the single structural stator can include inner stator poles and outer stator poles that each have dedicated windings for forming the first and second stators 24, 26 within a single structural stator. Various magnetic shielding can be incorporated between the first and second stators 24, 26 to prevent interference of the various magnetic fields that are generated by the axially-aligned first and second stators 24, 26. In this configuration, one of the first and second rotors 30, 32 is required to be an inner-type rotor 112 and the other of the first and second rotors 30, 32 is required to be an outer-type rotor 110 to accommodate the inner and outer configurations of the first and second stators 24, 26, similar to the configuration exemplified in FIG. 4.

The exact configuration of the first and second stators 24, 26 relative to one another is dependent upon the design of the appliance 12, the torque-related needs of the various components of the laundry appliance 12, the space available within the laundry appliance 12, and other various considerations having to do with space and operational capabilities of the various components of the laundry appliance 12.

The first and second stators 24, 26 include dedicated first and second windings 150, 152 that are incorporated to define the first and second stators 24, 26. The first and second stators 24, 26 are energized by delivering the first electrical current 36 to the first winding 150 and the second electrical current 42 to the second winding 152. Again, the first and second electrical currents 36, 42 are independent and separately delivered to the first and second stators 24, 26. It is contemplated that the first and second stators 24, 26 can be single phase or multi-phase stators. It is also contemplated that one of the stators can be a single phase stator and the other stator can be a multi-phase stator. In the various configurations of the first and second stators 24, 26, each of the first and second stators 24, 26 can be variable speed motors, where variations in the first and second electrical currents 36, 42 can result in variations in the rotational speed of the first and second rotors 30, 32. Additionally, such a configuration can produce a reversible operation such that one or both of the first and second rotors 30, 32 can operate in clockwise and counterclockwise directions, and at variable speeds. It is also contemplated that the second rotor 32 that operates the blower 14 can be a single speed motor that operates at a consistent speed for operating the blower 14 at that consistent rotational speed. Again, the various configurations of the dual-drive motor 28 can vary depending upon the design needs and constraints of a particular laundry appliance 12.

According to another aspect of the present disclosure, an electric motor for a laundry appliance includes a first stator having a central axis. A first rotor is in electromagnetic communication with the first stator and is rotationally operable about the central axis. A second stator is aligned with the central axis. A second rotor is in electromagnetic communication with the second stator and is rotationally operable about the central axis. The first and second stators are positioned within a common motor cavity of an outer housing. A controller regulates a first electrical current to the first stator and a second electrical current to the second stator. The controller includes a torque discrimination module for monitoring an output torque of at least the first rotor.

According to another aspect, the outer housing is a single overmold that surrounds the first and second stators.

According to yet another aspect, the outer housing includes a first housing that surrounds the first stator and a second housing that surrounds the second stator, wherein the first and second housings are attached together to define the common motor cavity.

According to another aspect of the present disclosure, the first rotor is rotationally coupled with a rotating drum.

According to another aspect, the second rotor is coupled to at least one of a blower and a fluid impeller.

According to yet another aspect, the torque discrimination module is a voltage sensor that monitors at least the first electrical current that is delivered to the first stator.

According to another aspect of the present disclosure, the first rotor is positioned within the first stator.

According to another aspect, the second rotor operates within the second stator.

According to yet another aspect, at least one of the first rotor and the second rotor are outer-type rotors.

According to another aspect of the present disclosure, a first drive shaft is attached to the first rotor. A second drive shaft is attached to the second rotor. The first and second drive shafts are positioned along the central axis.

According to another aspect, the first drive shaft includes a drive tube. The second drive shaft extends through and rotationally operates within the drive tube of the first drive shaft.

According to yet another aspect, a laundry appliance includes a blower that delivers process air through an airflow path. A rotating drum processes articles to be dehumidified. The airflow path includes the rotating drum and first and second stators. A first rotor is in electromagnetic communication with the first stator and operates to rotate the rotating drum. A second rotor is in electromagnetic communication with the second stator and operates to rotate the blower. A torque discrimination module is in communication with the first stator and the first rotor. The torque discrimination module monitors a first electrical current that is delivered to the first stator. A controller is in communication with the first and second stators and the torque discrimination module. The controller delivers the first electrical current to the first stator at least partially in response to a reading of the torque discrimination module.

According to another aspect of the present disclosure, the controller delivers the first electrical current to the first stator based upon the reading of the torque discrimination module. The controller delivers a second electrical current to the second stator. The first and second electrical currents are separately delivered by dedicated drivers.

According to another aspect, an outer housing defines a common motor cavity. The first and second stators are disposed within the common motor cavity.

According to yet another aspect, the outer housing includes a first housing that surrounds the first stator and a second housing that surrounds the second stator. The first and second housings are attached together to define the common motor cavity.

According to another aspect of the present disclosure, a first drive shaft is attached to the first rotor. The first drive shaft is coupled with the rotating drum. A second drive shaft is attached to the second rotor. The first and second drive shafts are positioned along a central axis.

According to another aspect, a fluid pump includes an impeller. The second drive shaft is coupled with each of the blower and the impeller.

According to yet another aspect, a laundry appliance includes a blower that delivers process air through an airflow path. A rotating drum separates condensate from articles to be processed. The airflow path includes the rotating drum. A fluid pump delivers the condensate through a fluid path. First and second stators are contained within a housing. A first rotor is in electromagnetic communication with the first stator and that operates to rotate the rotating drum. A second rotor is in electromagnetic communication with the second stator and operates to rotate the blower and the fluid pump. A torque discrimination module is in communication with the first stator and the first rotor. The torque discrimination module monitors a first electrical current that is delivered to the first stator.

According to another aspect of the present disclosure, a controller is in communication with the first and second stators and the torque discrimination module. The controller delivers the first electrical current to the first stator at least partially in response to a reading of the torque discrimination module. The controller delivers a second electrical current to the second stator.

According to another aspect, the first and second electrical currents are separately delivered by dedicated drivers.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An electric motor for an appliance, the electric motor comprising:
   a first stator;
   a first rotor in electromagnetic communication with the first stator and rotationally operable about a central rotational axis;
   a second stator;
   a second rotor in electromagnetic communication with the second stator and rotationally operable about the central rotational axis;
   an outer housing where the first stator and the second stator are positioned within a common motor cavity of the outer housing; and
   a controller that regulates a first electrical current to the first stator and a second electrical current to the second stator, wherein the controller includes a torque discrimination module for monitoring an output torque of the first rotor.

2. The electric motor of claim 1, wherein the outer housing is a single overmold that surrounds the first stator and the second stator.

3. The electric motor of claim 1, wherein the outer housing includes a first housing that surrounds the first stator and a second housing that surrounds the second stator, wherein the first and second housings are attached together to define the common motor cavity.

4. The electric motor of claim 1, wherein the torque discrimination module also monitors the output torque of the second rotor.

5. The electric motor of claim 1, wherein the torque discrimination module is a voltage sensor that monitors at least the first electrical current that is delivered to the first stator.

6. The electric motor of claim 1, wherein the first rotor is positioned within the first stator.

7. The electric motor of claim 1, wherein the second rotor operates within the second stator.

8. The electric motor of claim 1, wherein at least one of the first rotor and the second rotor are outer-type rotors.

9. The electric motor of claim 1, further comprising:
   a first drive shaft that is attached to the first rotor; and
   a second drive shaft that is attached to the second rotor, wherein the first and second drive shafts are positioned along the central rotational axis.

10. The electric motor of claim 9, wherein the first drive shaft includes a drive tube.

11. The electric motor of claim 10, wherein the second drive shaft extends through and rotationally operates within the drive tube of the first drive shaft.

12. An appliance motor comprising:
    a first stator and a second stator;
    a first rotor in electromagnetic communication with the first stator and that is configured to rotate a first rotating assembly
    a second rotor in electromagnetic communication with the second stator and that is configured to rotate a second rotating assembly;
    a torque discrimination module in communication with the first stator and the first rotor, wherein the torque discrimination module monitors a first electrical current that is delivered to the first stator; and
    a controller in communication with the first stator and the second stator and the torque discrimination module, wherein the controller delivers the first electrical current to the first stator at least partially in response to a reading of the torque discrimination module.

13. The appliance motor of claim 12, wherein the controller delivers the first electrical current to the first stator based upon the reading of the torque discrimination module, and wherein the controller delivers a second electrical current to the second stator, wherein the first and second electrical currents are separately delivered by dedicated drivers.

14. The appliance motor of claim 12, further comprising:
    an outer housing that defines a common motor cavity, wherein the first stator and the second stator are disposed within the common motor cavity.

15. The appliance motor of claim 14, wherein the outer housing includes a first housing that surrounds the first stator and a second housing that surrounds the second stator, wherein the first and second housings are attached together to define the common motor cavity.

16. The appliance motor of claim 12, further comprising:
    a first drive shaft that is attached to the first rotor, wherein the first drive shaft is configured to be coupled with the first rotating assembly; and
    a second drive shaft that is attached to the second rotor, wherein the first and second drive shafts are positioned along a central axis.

17. The appliance motor of claim 16, further comprising:
    a third rotating assembly, wherein the second drive shaft is configured to be coupled with each of the second rotating assembly and the third rotating assembly.

18. An appliance motor comprising:
    a first stator and a second stator that are contained within a housing;
    a first rotor in electromagnetic communication with the first stator and that operates to rotate a first drive shaft;
    a second rotor in electromagnetic communication with the second stator and that operates to rotate a second drive shaft, wherein the second drive shaft extends through the first drive shaft and out from opposing ends of the housing; and a torque discrimination module in communication with the first stator and the first rotor, wherein the torque discrimination module monitors a first electrical current that is delivered to the first stator.

19. The appliance motor of claim 18, further comprising:

a controller in communication with the first stator and the second stator and the torque discrimination module, wherein the controller delivers the first electrical current to the first stator at least partially in response to a reading of the torque discrimination module, and wherein the controller delivers a second electrical current to the second stator.

20. The appliance motor of claim 19, wherein the first and second electrical currents are separately delivered by dedicated drivers.

* * * * *